United States Patent
Jordan et al.

(10) Patent No.: US 7,454,590 B2
(45) Date of Patent: *Nov. 18, 2008

(54) MULTITHREADED PROCESSOR HAVING A SOURCE PROCESSOR CORE TO SUBSEQUENTLY DELAY CONTINUED PROCESSING OF DEMAP OPERATION UNTIL RESPONSES ARE RECEIVED FROM EACH OF REMAINING PROCESSOR CORES

(75) Inventors: Paul J. Jordan, Austin, TX (US);
Manish K. Shah, Austin, TX (US);
Gregory F. Grohoski, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 11/222,614

(22) Filed: Sep. 9, 2005

(65) Prior Publication Data
US 2007/0061548 A1    Mar. 15, 2007

(51) Int. Cl.
*G06F 12/08* (2006.01)

(52) U.S. Cl. .................. 711/207; 711/202; 711/203; 711/204; 711/205; 711/206

(58) Field of Classification Search ................. 711/206, 711/207
See application file for complete search history.

(56) References Cited

U.S. PATENT DOCUMENTS

| | | | |
|---|---|---|---|
| 5,317,705 A | 5/1994 | Gannon et al. | |
| 5,428,757 A | 6/1995 | Sutton | |
| 5,437,017 A | 7/1995 | Moore et al. | |
| 5,487,162 A | 1/1996 | Tanaka et al. | |
| 5,497,780 A * | 3/1996 | Zehender | 600/374 |
| 5,906,001 A | 5/1999 | Wu et al. | |
| 5,960,463 A * | 9/1999 | Sharma et al. | 711/206 |
| 6,119,204 A | 9/2000 | Chang et al. | |
| 6,560,664 B1 | 5/2003 | Carlson | |
| 6,633,967 B1 | 10/2003 | Duncan | |
| 2003/0126371 A1 | 7/2003 | Venkatraman | |
| 2004/0103248 A1* | 5/2004 | Hass et al. | 711/117 |

OTHER PUBLICATIONS

Office Action from U.S. Appl. No. 11/222,577, mailed Aug. 22, 2007.

\* cited by examiner

*Primary Examiner*—Matt Kim
*Assistant Examiner*—Hetul Patel
(74) *Attorney, Agent, or Firm*—Lawrence J. Merkel; Meyertons, Hood, Kivlin, Kowert & Goetzel, P.C.

(57) ABSTRACT

In one embodiment, a processor comprises a plurality of processor cores and an interconnect to which the plurality of processor cores are coupled. Each of the plurality of processor cores comprises at least one translation lookaside buffer (TLB). A first processor core is configured to broadcast a demap command on the interconnect responsive to executing a demap operation. The demap command identifies one or more translations to be invalidated in the TLBs, and remaining processor cores are configured to invalidate the translations in the respective TLBs. The remaining processor cores transmit a response to the first processor core, and the first processor core is configured to delay continued processing subsequent to the demap operation until the responses are received from each of the remaining processor cores.

17 Claims, 11 Drawing Sheets

To/from crossbar

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

Fig. 3

MULTITHREADED PROCESSOR HAVING A SOURCE PROCESSOR CORE TO SUBSEQUENTLY DELAY CONTINUED PROCESSING OF DEMAP OPERATION UNTIL RESPONSES ARE RECEIVED FROM EACH OF REMAINING PROCESSOR CORES

BACKGROUND

1. Field of the Invention

This invention is related to translation lookaside buffers (TLBs) and demapping of translations in the TLBs, especially in multithreaded processors.

2. Description of the Related Art

Processors and computer systems that include the processors typically implement a virtual memory system, in which most software executing on the processors and accessing memory do so using virtual (or effective) addresses. These addresses are translated through the virtual memory system to physical addresses, which are used to access memory. A virtual memory system offers several benefits: it allows software to address a larger virtual memory space than the actual physical memory included in the system; it allows multiple independent processes to access memory while being protected from interfering with each other (e.g. by one process modifying data used by another process); etc.

Generally, the virtual memory system (and particularly the mapping of virtual addresses to physical addresses) is under software control. Software builds data structures in memory that describe the virtual to physical mappings. These data structures are usually referred to as "page tables", since many translations translate a page of the virtual address space to a page of physical memory, aligned to a page boundary in the physical memory space. Page sizes vary, from 4 kilobytes to several megabytes or even larger. A given virtual memory system often supports more than one page size.

Performing a translation frequently requires several accesses to the page tables in memory. Even if the page tables are cached, the process of searching the page table entries is a lengthy process, as compared to the amount of time needed to execute a given instruction. The added latency on memory accesses (both instruction fetches and load/store operations) to perform the translation process each time would hamper performance. Accordingly, most processors implement a cache for a subset of the translations from the page tables, referred to as a translation lookaside buffer (TLB). The TLB caches the results of the translation process, which includes an identification of the virtual address and the corresponding physical address, as well as any protection data that may be included in the virtual memory system (again, generally under the control of software). The data cached in the TLB and used to translate a given range of virtual addresses (e.g. a page) is referred to as a "translation" for the range/page. The translation may include contents derived from multiple page table entries or one page table entry, depending on the definition of the virtual memory system.

At various points in time, the software that controls the virtual memory system (referred to as memory management software) needs to reclaim physical memory that is currently mapped (e.g. to map other virtual addresses to the physical memory). To reclaim physical memory, the memory management software invalidates the current mappings to the physical memory in the page tables and establishes the new mappings. However, the old translations may be cached in the TLBs. Accordingly, the memory management software, after modifying the page tables, must also ensure that any translations derived from the invalidated page table entries are invalided in the TLBs.

In a single-threaded processor, it is sufficient for the memory management software to issue a TLB translation removal operation (referred to herein as a demap operation) on the processor and the TLB (or TLBs) in the processor will be invalidated. In multiprocessor systems, the TLBs on each processor must be invalidated. In some cases, the demap operation is issued on each processor. In the PowerPC architecture, two instructions are used to invalidate TLBs in a multiprocessor system: a TLB invalidate instruction (tlbie) that is transmitted by the executing processor to all other processors, and a TLB synchronization instruction (tlbsync) that follows the tlbie. The executing processor also transmits the tlbsync to all other processors, which retry the tlbsync until the TLB invalidation is complete. When the tlbsync is successfully transmitted without retry, all TLBs are known to be invalidated. Since the tlbsync is retried until a TLB invalidation is complete, the possibility of livelock exists if two processors are executing the tlbie/tlbsync sequence at the same time. Thus, software must ensure that only one processor executes the code sequence that includes the tlbie/tlbsync. Additional instructions may also be required (e.g. a synchronization instruction (sync) prior to the tlbie).

In a multithreaded processor, hardware is provided, to support each thread that can be concurrently active in the processor. The hardware that supports a given thread is referred to as a "strand". Strands may share a TLB. At any given point in time, two or more threads may have a translation cached outside of the TLB. For example, the hardware table walker may have already read the translation, prior to page table modification and in response to a TLB miss for a thread on another strand that shares the TLB, but not yet loaded it into the TLB. Alternatively, the translation may be cached by memory management software executing in response to a page fault from another thread, such as in registers that correspond to the strand or memory locations separate from the page tables. Accordingly, it is possible that, even after executing the demap operation on one strand, other threads executing on other strands that share the TLB may cause the translation to be reloaded in the TLB.

To prevent the reload after the demap operation, memory management software typically issues the demap operation on each strand that may share the TLB. Once the demap operation has completed on each strand, the translation is known to be invalidated in the TLB and will not be reloaded (since the translation is invalidated in the page tables and is no longer cached with respect to other active threads). While functionally correct, this solution is a low performance mechanism since the thread executing on each strand must be interrupted to perform the demap operation.

Even if fewer than all the strands could be interrupted to perform a demap operation, multiple strands would still need to be interrupted if multiple TLBs are included and different sets of strands share different TLBs. For example, a multi-core, multithreaded processor may include multiple processor cores, each having multiple strands that share a TLB in the core. In such systems, one or more strands that share each TLB would have to be interrupted to perform a demap operation.

SUMMARY

In one embodiment, a processor comprises a plurality of processor cores and an interconnect to which the plurality of processor cores are coupled. Each of the plurality of processor cores comprises at least one translation lookaside buffer (TLB). A first processor core is configured to broadcast a demap command on the interconnect responsive to executing a demap operation. The demap command identifies one or more translations to be invalidated in the TLBs, and remaining processor cores are configured to invalidate the translations in the respective TLBs. The remaining processor cores transmit a response to the first processor core, and the first processor core is configured to delay continued processing subsequent to the demap operation until the responses are received from each of the remaining processor cores. A similar method is also contemplated.

In another embodiment, a processor comprises a plurality of processor cores and an interconnect to which the plurality of processor cores are coupled. Each processor core comprises a plurality of strands, wherein each strand comprises hardware to support a different thread of a plurality of concurrently activateable threads in the processor core. Additionally, each processor core further comprises at least one TLB. A first processor core of the plurality of processor cores is configured to broadcast a demap command on the interconnect responsive to executing a demap operation, wherein the demap command identifies one or more translations to be invalidated in the TLBs. Remaining processor cores of the plurality of processor cores are configured to invalidate the translations in the respective TLBs.

BRIEF DESCRIPTION OF THE DRAWINGS

The following detailed description makes reference to the accompanying drawings, which are now briefly described.

FIG. 3 is a pipeline diagram illustrating one embodiment of a pipeline that may be implemented by the core shown in FIG. 1.

Figure 1:
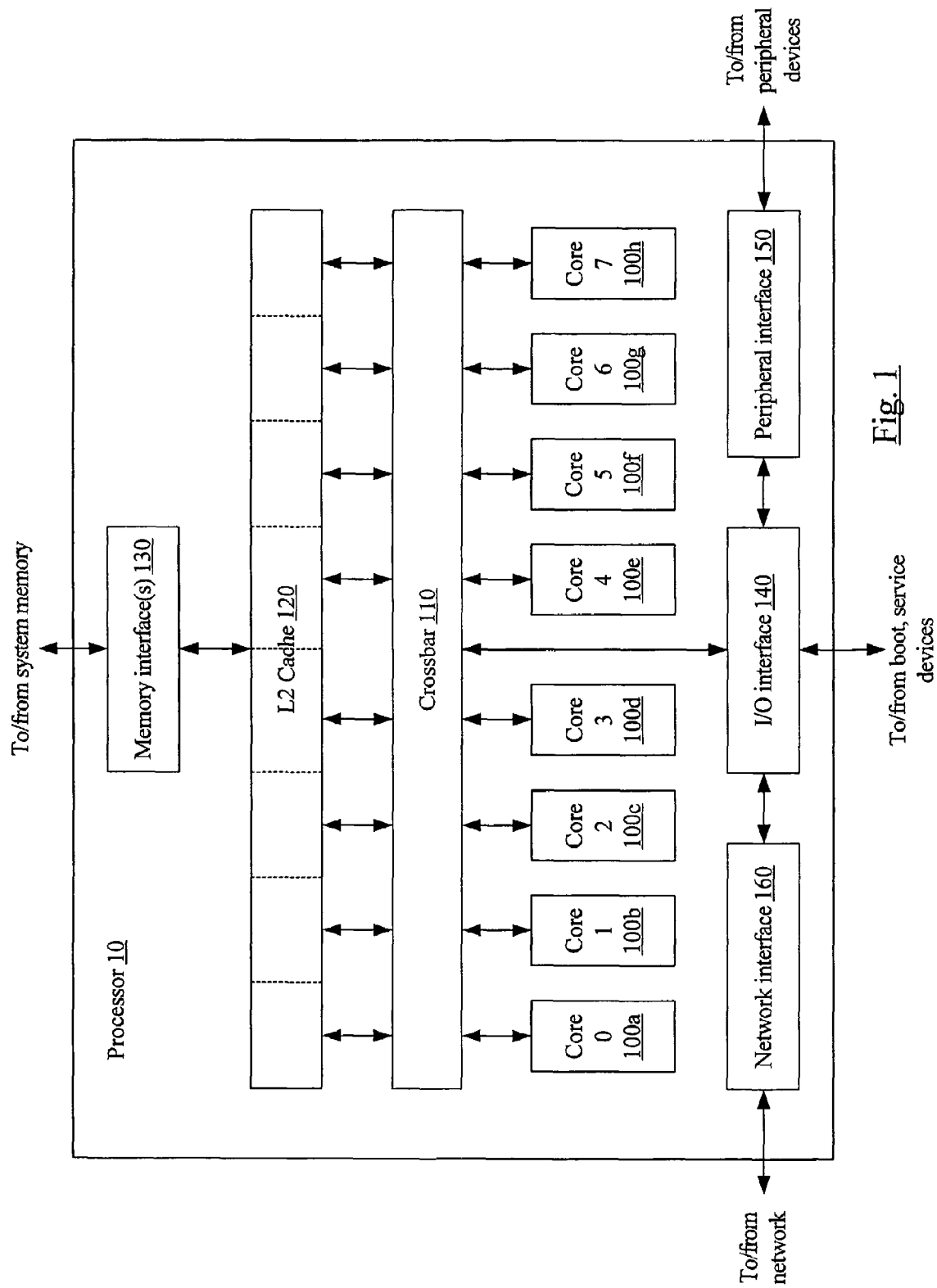
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Figure 2:
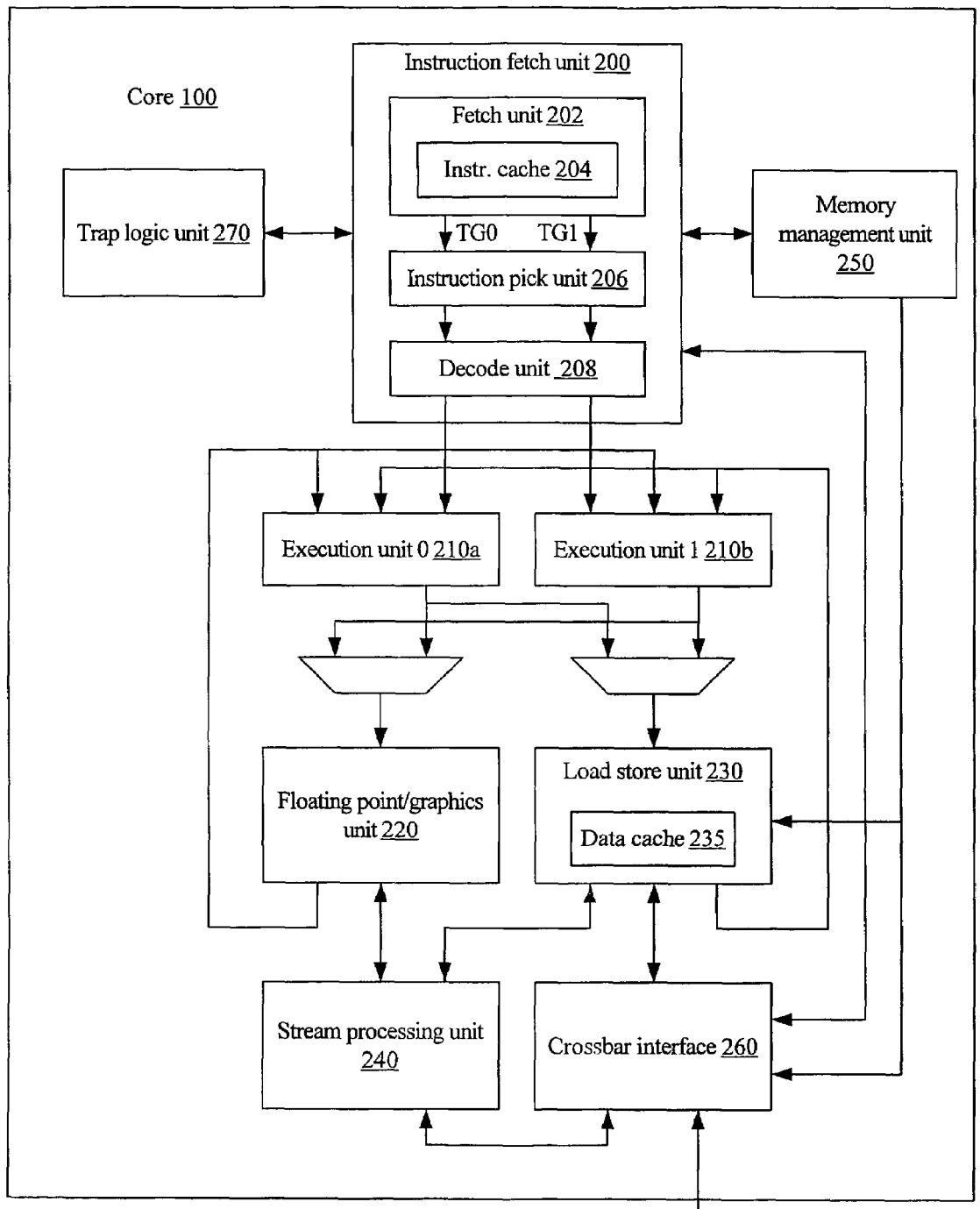
FIG. 2 is a block diagram of one embodiment of a core shown in FIG. 1.

FIGS. 1-3 present an overview of a multithreaded processor 10 that may implement the demap operations as described in more detail below. In other embodiments, the processor may be implement other multithreaded configurations, as desired.

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 maybe configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 204 may include fewer access ports than the number of threads executable on core 100, in which case fetch unit 202 may implement arbitration logic configured to select one or more threads for instruction fetch during a given execution cycle. For example, fetch unit 202 may implement a least-recently- fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS™) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translations may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

TLB Demapping in a TLB Shared by Multiple Threads/ Strands

As mentioned above, in one embodiment, each of the cores 100 may be multithreaded. That is, each core 100 may include multiple strands, where each strand comprises the hardware that supports one thread. Thus, the number of strands per core is equal to the number of threads that can be concurrently active within the core (e.g. 8, in one embodiment). For example, in the embodiment of FIG. 2 as described above, a strand may include the hardware within the IFU 200 to fetch instructions for the corresponding thread and store the instructions for issue by the pick unit 206. A strand may share the instruction cache 204 with all other strands, and may share the decode unit 208 and the EXU 210a or 210b with other strands in the same thread group. A strand may share the LSU 230 (including data cache 235), the FPU 220, and the SPU 240 with all other strands. The amount of hardware sharing between strands may vary from embodiment to embodiment.

In a given core, two or more strands share a TLB (or TLBs). In one embodiment shown in FIG. 4, all of the strands in a core share an ITLB and a DTLB. In other embodiments, there may be more than one TLB (or more than one ITLB and more than one DTLB) in a core and subsets of strands may share a TLB. For example, the strands that form a given thread group may share TLBs. Any amount of sharing may be implemented in various embodiments.

The core 100, and more particularly the MMU 250 in the illustrated embodiment, may track whether or not a TLB update is pending for the strands. A TLB update may be pending, for example, if a hardware table walk has been initiated in response to a TLB miss, or if a page fault trap has been taken by a thread on one of the strands. If a demap operation is issued on one of the strands, and a TLB update is pending, the core 100 may delay the demap operation until the pending TLB updates are completed (or in the case of a page fault trap, until a return from the page fault occurs, whether or not a TLB update is performed in the page fault handler). The demap operation is then processed, invalidating the identified translation(s) in the TLB(s). Any subsequently-initiated TLB updates will obtain the new translation (and will not obtain the old translation that has been removed from the page tables). Any previous updates to the TLB that may have loaded the old translations will be invalidated.

Figure 12:
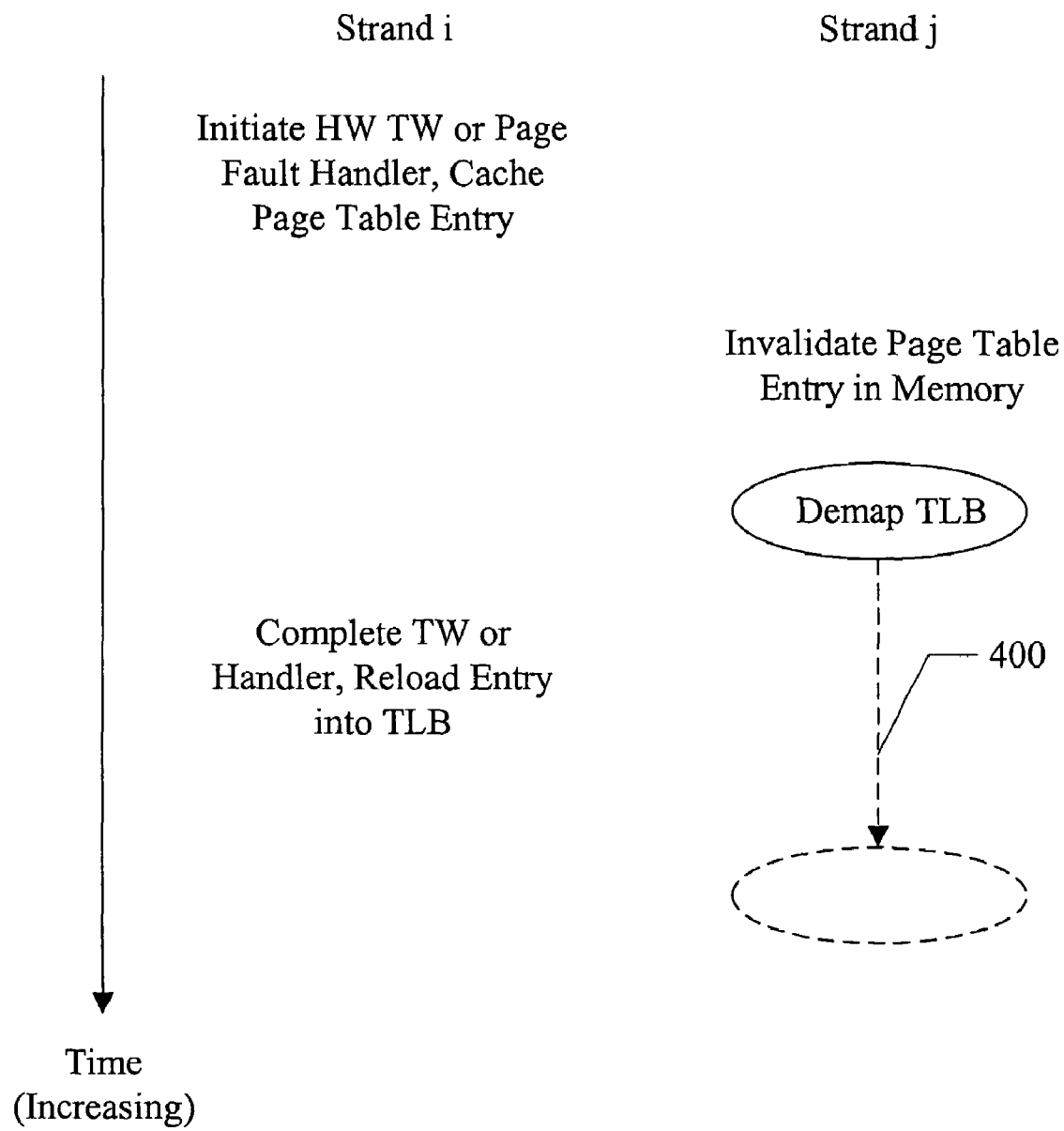
FIG. 12 is a timing diagram illustrating a potential reload of an invalidated translation that is avoided by tracking pending TLB updates and handling TLB demaps as described herein.

Accordingly, in one embodiment, the demap operation may be issued on only one strand that shares a given TLB. The other strands may continue executing their assigned threads, without interruption for the demap operation. If desired, when multiple demap operations are to be performed, separate demap operations may be issued on each strand that shares a TLB, parallelizing the demap operations. Furthermore, in one embodiment, a potential reload of the invalidated translation from a cached page table entry may be avoided. The potential reload is illustrated in FIG. 12, where execution on a strand i and a strand j are shown. Strands i and j share a TLB. In FIG. 12, time is shown increasing in a downward direction, as illustrated by the arrow on the left side. On strand i, a hardware table walk is initiated (or a page fault handler is invoked: a similar caching problem exists in either case). A page table entry is cached (either in the hardware table walk unit or in software-managed storage). Subsequently, software on strand j invalidates the same page table entry that has been cached via strand i, and includes a demap operation to demap the translation in the TLB. Subsequent to the demap, the table walk or the page fault handler completes for strand i using the cached page table entry, and the translation is reloaded into the TLB (even though it is now invalidated in the page tables in memory). The translation may subsequently be accessed in the TLB, which is functionally incorrect. By detecting the pending TLB update initiated by strand i in FIG. 12, and delaying the demap operation on strand j until the pending TLB update is no longer pending, reload of the translation after it has been invalidated in the page tables in memory may be avoided. Delaying the demap operation is illustrated in FIG. 12 by the dotted arrow 400, moving the circled demap operation to after the completion of the table walk or page fault handling on strand i.

As used herein, a demap operation comprises any operation that is defined to invalidate at least one translation in a TLB. In some embodiments, there may be several versions of demap operations. For example, demap operations may include demap page, which invalidates the translation for an identified page; demap context, which invalidates translations associated with virtual addresses in a given context (e.g. by process ID or another identifier that identifies the context); and demap partition (which demaps all virtual addresses in a logical partition). Generally, a demap operation may demap translations according to any translation attribute (e.g. virtual page number, context ID, partition ID, etc.). Demap operations may comprise one or more instructions. For example, the instructions may be defined at the ISA level (such at the tlbie described above). Alternatively, the instruction may be a store to a specified address which is mapped to a memory-mapped register, and the store data may be the identifier of the virtual page(s) to be demapped. In the SPARC ISA, for example, the store is to an address mapped to a specified address space identifier (ASI) register that is defined to perform a demap for the virtual address(es) identified by the value written into the register. Any register may be used in other embodiments (e.g. an architecturally-specified register, a model-specific register, etc.).

Figure 4:
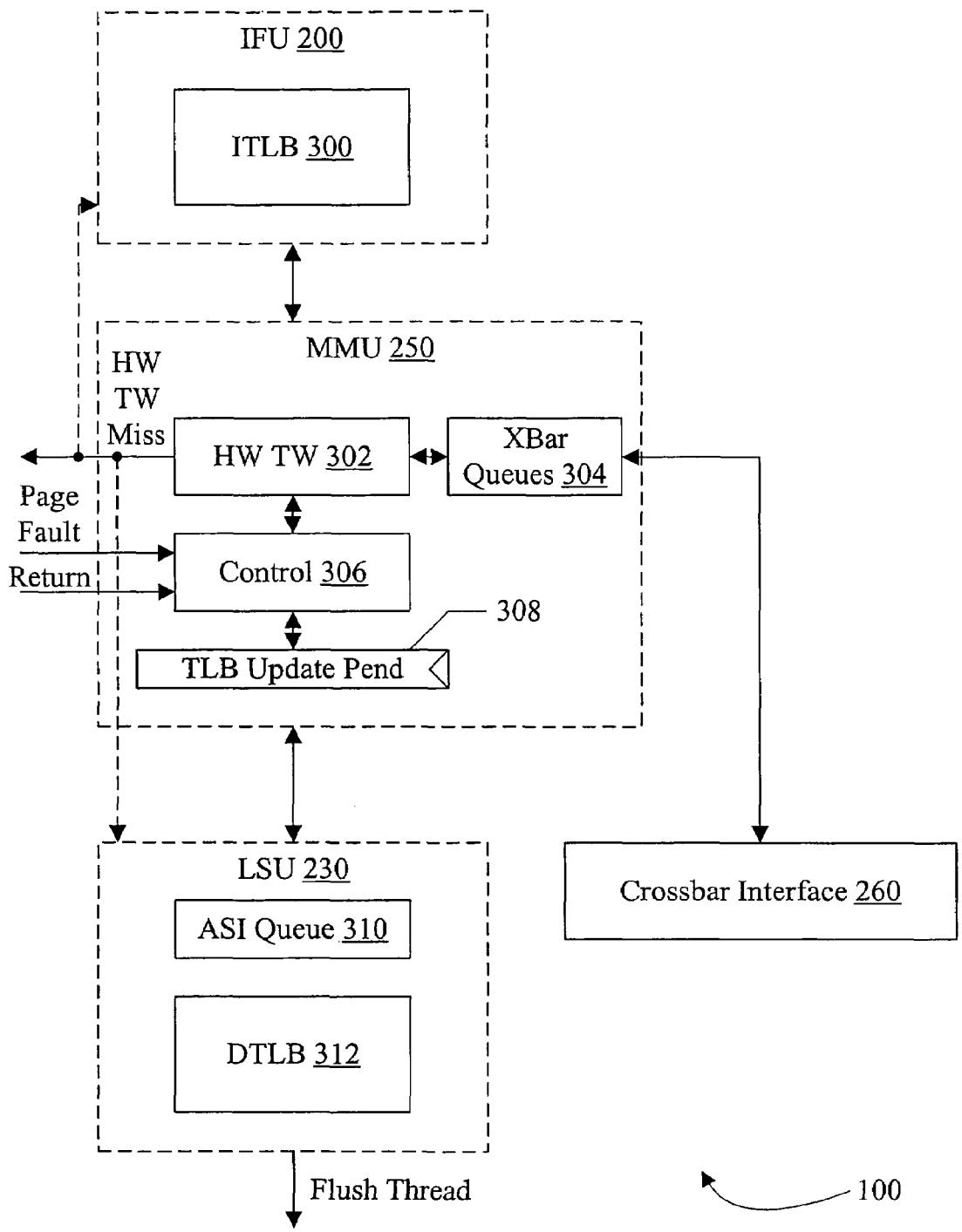
FIG. 4 is a block diagram of a portion of one embodiment of a core shown in greater detail.

Turning now to FIG. 4, a portion of the core 100 shown in FIG. 2 for one embodiment is shown in more detail. Cores 100a-100h may be instances of the core 100, for example. Particularly, the IFU 200, the MMU 250, the LSU 230, and the crossbar interface 260 are shown. The IFU 200 and the LSU 230 are coupled to the MMU 250, which is further coupled to the crossbar interface 260. The LSU 230 and the IFU 200 may also be coupled to the crossbar interface 260 (e.g. see FIG. 2). In the illustrated embodiment, the IFU 200 includes an ITLB. The MMU 250 includes a hardware table walk unit (HW TW) 302, one or more crossbar queues 304 coupled to the hardware table walk unit 302, a control unit 306 coupled to the hardware table walk unit 302, and a TLB update pending register 308 coupled to the control unit 306. The crossbar queues 304 are coupled to the crossbar interface 260. The LSU 230 includes an ASI queue 310 and a DTLB 312. The LSU 230 is also configured to issue a flush thread indication ("flush thread" in FIG. 4). The control unit 306 may be coupled to receive a page fault signal and a return signal.

If the ITLB 300 detects a miss for a translation request (for a fetch in the instruction cache 204), the IFU 200 may transmit a TLB reload request to the MMU 250. The MMU 250 may initiate a table walk in the hardware table walk unit 302 responsive to the request. The hardware table walk unit 302 may be programmed with the base address of the page tables, and may be designed to search the page tables for a translation according to the definition of the page tables and the defined algorithm for accessing them for a given virtual address in the virtual memory system. For example, a portion of the virtual address may be used, sometimes in combination with a predefined hash function, as an index into the page tables. If the hardware table walk unit 302 successfully locates a translation in the page tables, the MMU 250 may return the translation for storage in the ITLB 300. If no translation is found, the MMU 250 (and more particularly the hardware table walk unit 302) may signal a hardware table walk miss (HW TW miss signal in FIG. 4). The MMU 250 may signal the HW TW miss directly to the TLU 270 for handling. Alternatively, the MMU 250 may signal the HW TW miss to the IFU 200 (dotted line in FIG. 4). If an instruction is to issue from the virtual page for which no translation was located, a page fault may be signalled at that point.

Similarly, if the DTLB 312 detects a miss for a translation request (for a load or store data access in the data cache 235), the LSU 230 transmits a TLB reload request to the MMU 250. The MMU 250 may either return a translation for storage in the DTLB 312 (successful table walk) or signal a HW TW miss (unsuccessful table walk). The MMU 250 may signal the HW TW miss directly to the TLU 270, or to the LSU 230 (dotted line in FIG. 4), which may associate the HW TW miss with the correct load/store instruction.

The hardware table walk unit 302 may generate requests to the crossbar interface 260 to read page table entries from the L2 cache 120 and/or memory (and optionally to write page table entries, such as to update a reference bit and/or change bit that may be used by software to determine which entries have been accessed/updated). The crossbar queues 304 may be used to store requests and corresponding data returned from the crossbar interface 260. In some embodiments, the requests may be passed through the data cache 235 first, if page table entries are cacheable in the data cache 235, before being transmitted to the crossbar queues 304.

The control unit 306 is configured to track whether or not one or more strands have TLB updates pending, and may be configured to delay demap operations issued on strands that share the TLB if at least one TLB update is pending. The control unit 306 may track the pending updates in the TLB update pending register 308. The control unit 306 may track pending updates in any fashion. For example, the register 308 may store a vector of bits, each bit corresponding to a strand. The bit may be set to indicate if a TLB update is pending on that strand, and may be clear to indicate that no update is pending. Such a vector may permit any combination of hardware table walks and traps to memory management software (page faults) to be outstanding at a given point in time. In other embodiments, the core 100 may limit the number of outstanding hardware table walks/page faults, and different representations may be stored in the TLB update pending register 308. For example, if only one hardware table walk or page fault is permitted to be outstanding in the processor core 100, a bit may be used to indicate whether or not a TLB update is pending. In some embodiments, the core 100 may also permit multiple table walks to be outstanding per thread that shares the TLB.

The control unit 306 is coupled to the hardware table walk unit 302, and may detect initiation of a table walk by the hardware table walk unit 302 for a thread executing on a strand. The control unit 306 may record that a TLB update is pending for the strand in response to the table walk being initiated. Additionally, the control unit 306 may receive an indication of a page fault ("page fault" in FIG. 4) which may identify the strand for which the page fault is detected. The control unit 306 may record the strand as having a TLB update pending. The control unit 306 may also receive an indication of which strands are executing threads that return to a lower trap level ("return" in FIG. 4). In one embodiment, both a table walk completion and a page fault return cause a return to a lower trap level (e.g. the level at which the user code executes). The control unit 306 may record no update pending in response to the strand returning to a lower trap level.

The core 100 may also implement a mechanism to ensure that the demap operation completes (e.g. the mechanism may ensure that the demap operation is not delayed indefinitely due to subsequently-initiated table walks or page faults that cause the detection of pending TLB updates). For example, in one embodiment, the core 100 (or the control unit 306, in the illustrated embodiment) may prevent initiation of any subsequent page faults or table walks when there is a pending demap operation. In one embodiment, the control unit 306 may prevent the start of a hardware table walk when there is a pending demap operation. To prevent a strand causing a page fault, the control unit 306 may set an "MMU busy" bit when a demap operation is pending so that other strands cannot access the MMU (a temporary hardware stall). In another embodiment, an additional register may be updated with the contents of the TLB Update Pending register 308 in response to queuing a demap operation. This additional register effectively captures the state of the pending updates at the time the demap operation is queued, and is not updated to reflected newly pending updates that occur after the demap operation is queued. The additional register may be updated to indicate updates are not pending as hardware table walks complete and returns to lower trap levels occur (similar to the TLB Update Pending register 308). The additional register may be used to determine when the demap operation can be completed (i.e. when the additional register no longer indicates any pending TLB updates). There may be one of these additional registers per thread, or one additional register may be used that updates each time a demap operation is queued (while retaining the pending updates from the previous update).

In this embodiment, demap operations are stores to specified ASI addresses. Accordingly, the demap operations map be detected in the LSU 230, when the address is generated for a store. The LSU 230 and the MMU 250 (more particularly, the control unit 306) may communicate to determine if the demap operation may proceed immediately, or if it is to be delayed (stalled) in the LSU 230. For example, the control unit 306 may transmit a signal to the LSU 230 indicating whether or not a TLB update is outstanding, and the LSU 230 may use the signal to determine if the demap operation is to be delayed. If the demap operation is not delayed, the LSU 230 may process the demap in the DTLB 312 and may also transmit it to the IFU 200 (through the MMU 250, or directly to the IFU 200) to process the demap in the ITLB 300. Processing the demap in a TLB may include invalidating one or more translations in the TLB that are identified by the demap. Demap operations may also be supported that target a specific TLB (e.g. only the ITLB 300 or only the DTLB 312). In such cases, the translation may be invalidated only in the targeted TLB.

In one embodiment, if the demap operation is delayed, the LSU 230 may queue the demap operation in the ASI queue 310. The LSU 230 may process ASI register reads and writes from the ASI queue 310. If a demap operation is queued in the ASI queue 310, the queued demap operation may take precedence over an executing demap operation that has not been enqueued yet. The LSU 230 may also signal that the thread containing the demap operation is to be flushed if the demap operation is delayed ("flush thread" in FIG. 4). In one embodiment, the LSU 230 may signal the TLU 270, which may coordinate the flushing of the thread and stalling the IFU 200 from fetching on the corresponding strand until the demap operation completes. In another embodiment, the LSU 230 may propagate the flush directly to the upstream pipeline stages. The TLU 270 may restart fetching after the table walk completes or the page fault returns. Each of these may be detected, in one embodiment implementing the SPARC ISA, by a reduction in the trap level at which the corresponding thread is executing.

It is noted that, while the control unit 306 and the TLB update pending register 308 are illustrated within the MMU 250 in this embodiment, the control unit 306 and TLB update pending register 308 may be located anywhere within the core 100, as desired.

Figure 5:
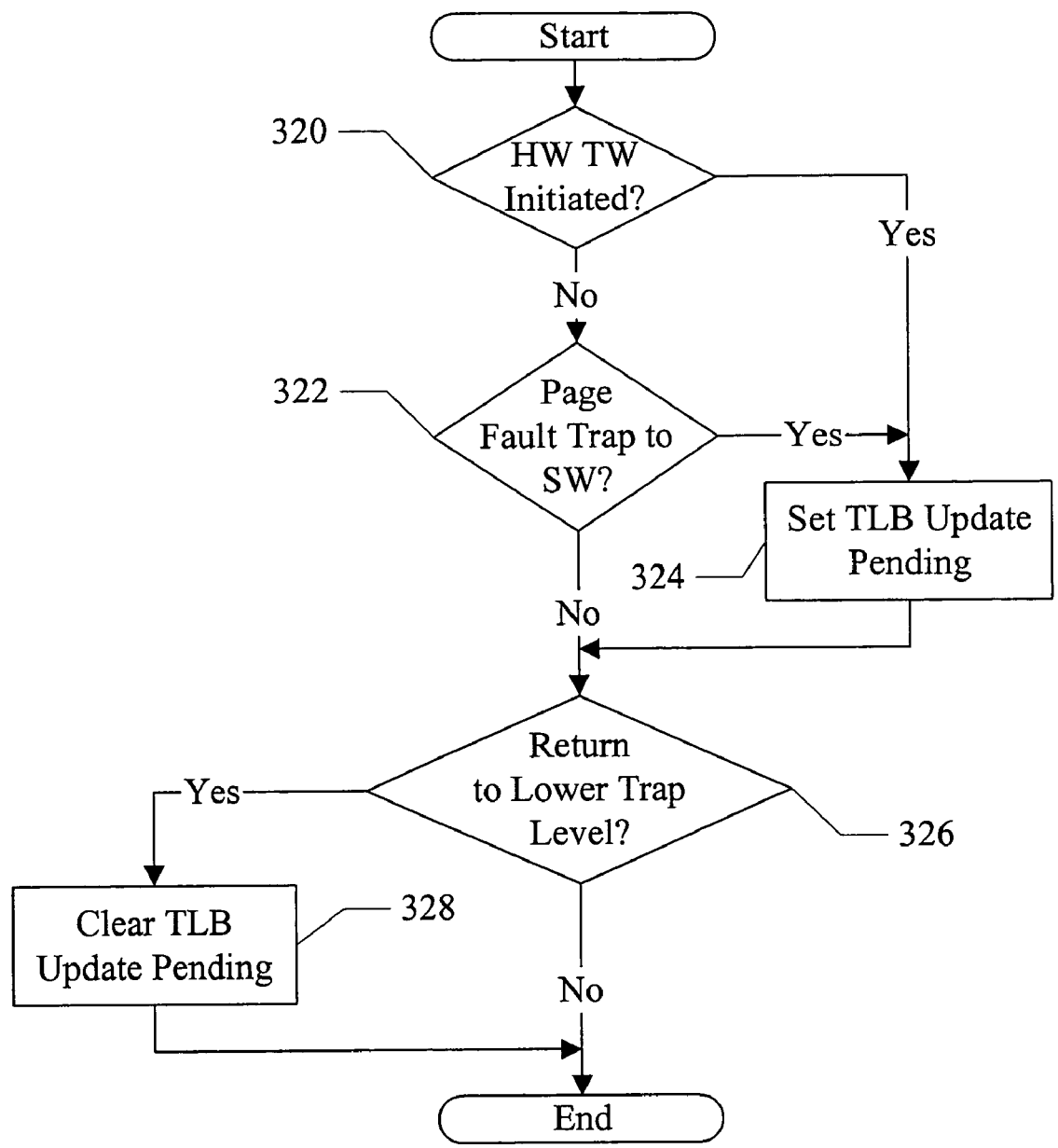
FIG. 5 is a flowchart illustration operation of one embodiment of a control unit in an MMU to track pending TLB updates.

Turning now to FIG. 5, a flowchart is shown illustrating operation of one embodiment of the control unit 306 to maintain the TLB update pending status for a strand. Similar operation may be performed in parallel for each strand in the core 100 (or for each strand that shares the same TLB, in some embodiments). While the blocks are shown in a particular order in FIG. 5 for ease of understanding, blocks may be performed in parallel in combinatorial logic in the control unit 306. For example, decision block 326 and block 328 may be independent of blocks 320, 322, and 324 and may be implemented in parallel. Blocks, combinations of blocks, and/or the flowchart as a whole may be pipelined over multiple clock cycles.

The embodiment illustrated by the flowchart of FIG. 5 may be used, e.g., if pending TLB updates are represented by a bit vector having a bit for each strand. The bit is set to indicate that a TLB update is pending and clear to indicate that no TLB update is pending. Other embodiments may reverse the meanings of the set and clear states. If a hardware table walk is initiated for the thread executing on the strand (decision block 320, "yes" leg) or a page fault trap to software occurs for the thread (decision block 322, "yes" leg), the control unit 306 may set the TLB update pending bit for the strand (block 324). If the thread executing on the strand returns to a lower trap level (decision block 326, "yes" leg), the control unit 306 may clear the TLB update pending bit for the strand (block 328). Returning to a lower trap level may occur when the hardware table walk unit completes (successfully or unsuccessfully), or the control unit 306 may detect the HW TW miss signal and may clear a TLB update pending bit for that strand that had its table walk completed.

Figure 6:
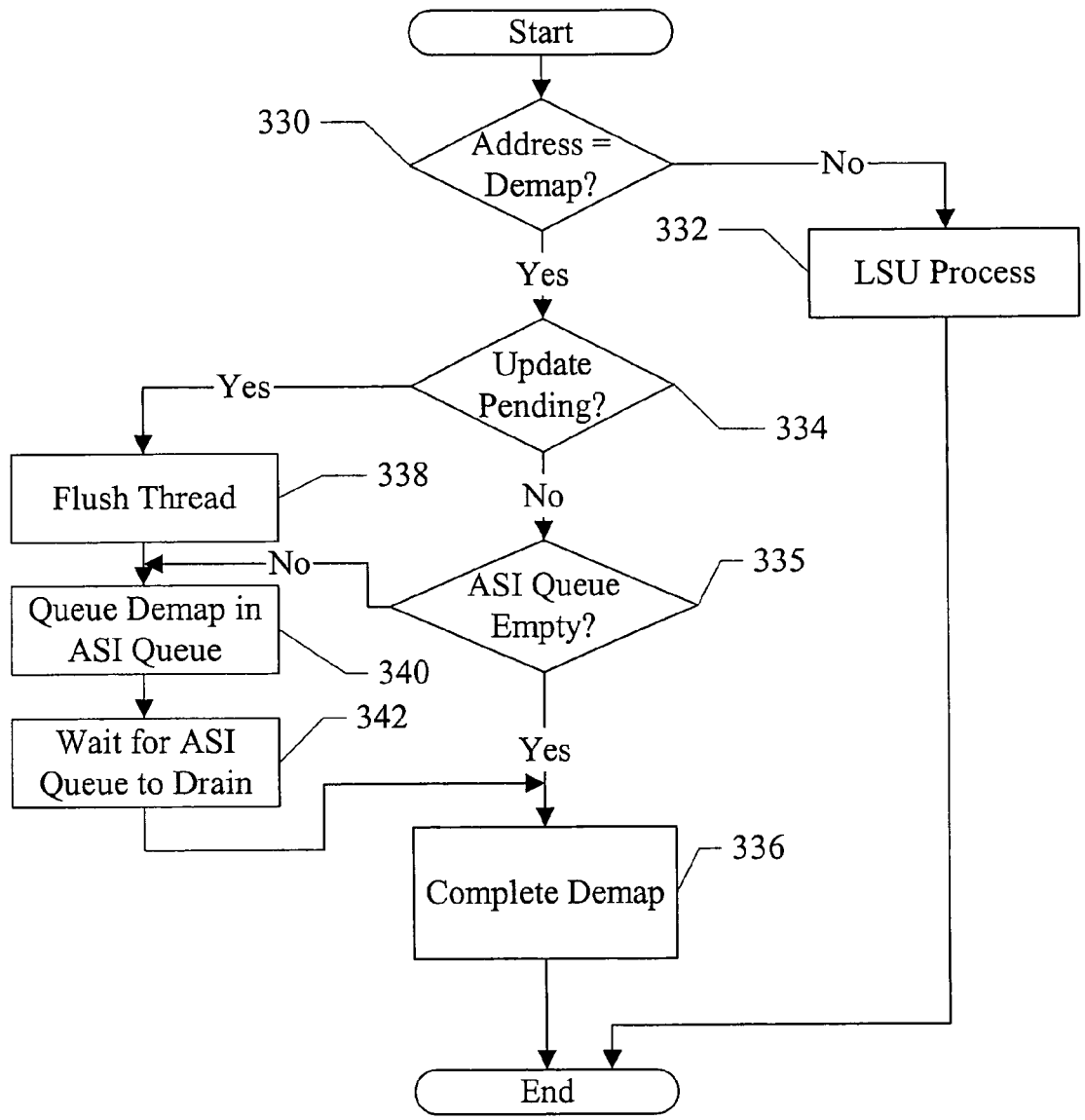
FIG. 6 is a flowchart illustrating operation of one embodiment of a core to process a demap operation.

Turning now to FIG. 6, a flowchart is shown illustrating operation of one embodiment of the LSU 230 during execution of a store instruction. While the blocks are shown in a particular order in FIG. 6 for ease of understanding, blocks may be performed in parallel in combinatorial logic in the LSU 230. Blocks, combinations of blocks, and/or the flowchart as a whole may be pipelined over multiple clock cycles.

The LSU 230 may generate the virtual address for the store instruction from its operands. Alternatively, the EXUs 210a-210b may perform the address generation, and may supply the address to the LSU 230. The LSU 230 may decode the address to determine if the address is mapped to the ASI register used for demap operations. The LSU 230 may also decode the instruction, immediate data, and/or machine state maintained by the core 100 to detect the demap operation. If not (decision block 330, "no" leg), the LSU 230 may process the store instruction as normal (block 332). Block 332 may include processing other ASI addresses that do not address the ASI register for demap operations, and may include enqueuing such operations in the ASI queue 310.

If the address is mapped to the ASI register used for demap operations (block 330, "yes" leg) and no TLB update is pending, as indicated by control unit 306 (decision block 334, "no" leg), and the ASI queue 310 is empty (decision block 335, "yes" leg), the LSU 230 may complete the demap operation (block 336). As mentioned above, completing the demap operation may include invalidating the translations indicated by the demap operation in the DTLB 312, if any, and providing the demap operation to the IFU 200 to invalidate the translations in the ITLB 300. If at least one TLB update is pending (decision block 334, "yes" leg), the LSU 230 may flush the thread from which the demap operation is issued (block 338) and may enqueue the demap operation in the ASI queue 310, delaying the demap operation (block 340). The demap operation may remain in the ASI queue 310 until no more TLB updates are pending, as indicated by the control unit 306. The LSU 310 may wait for the ASI queue 310 to drain (block 342) and then may complete the demap operation (block 336). If no TLB updates are pending (decision block 334, "no" leg) and the ASI queue is not empty (decision block 335, "no" leg), the LSU 230 may enqueue the demap operation in the ASI queue 310 (block 340) and may wait for the ASI queue 310 to drain (block 342) before completing the demap operation (block 336). If the thread was flushed due to queuing of the demap operation in the ASI queue 310, the thread is refetched after the ASI queue 310 drains and the demap operation completes, to permit execution of the next instruction in the thread.

TLB Demapping Across Multiple Cores

In embodiments having multiple cores, the mechanism described above ensures invalidations of TLBs in one core. The same process may be repeated, in some embodiments, on each core to invalidate the TLBs across the processor 10. Other embodiments may implement the mechanism described below to invalidate TLBs across multiple cores using a demap operation executed in one core.

A processor core that executes a demap operation (a "source core") may be configured to broadcast a demap command over the interconnect that couples the cores, the L2 cache, and the memory system. The other cores ("receiving cores") receive the demap command from the interconnect and may process the demap command internally, invalidating the translations identified by the demap command in any TLBs in the core. Once the processing of the demap command is complete, the receiving cores may transmit a response to the source core. Once the source core receives responses from each of the receiving cores, the demap operation may be completed locally in the source core. Thus, once the demap operation completes, the TLBs across the processor 10 are known to be invalidated. Furthermore, using a request/response structure for performing the demap operation may, in some cases, avoid a separate synchronization operation after the demap operation. In some embodiments, multiple cores may transmit demap commands concurrently, or overlapped in time, without concern for livelock between the cores. If a large number of demap operations are needed, they may be spread across multiple cores to further parallelize the demap, if desired.

A demap command may comprise a transmission on the interconnect that couples cores to the memory system. Thus, the demap command may be formatted according to the definition of transmissions on the interconnect, and may differ from the demap operation executed within a core. The demap command further includes at least data that identifies the translation or translations to be invalidated (e.g. virtual page, context ID, partition ID, etc.). Other control information may be included in various embodiments.

The receiving cores may process the demap command in any desired fashion. For example, the demap command may be processed in a similar manner to internally executed demap operations. In one embodiment, the internal demap operations may be processed as described above, by tracking the pending TLB updates and delaying completion of the demap operation until there are no pending TLB updates. In such an embodiment, the same mechanism may be used to process the demap command in the receiving cores. Such an embodiment is described in more detail below, but any mechanism may be used in general.

Figure 7:
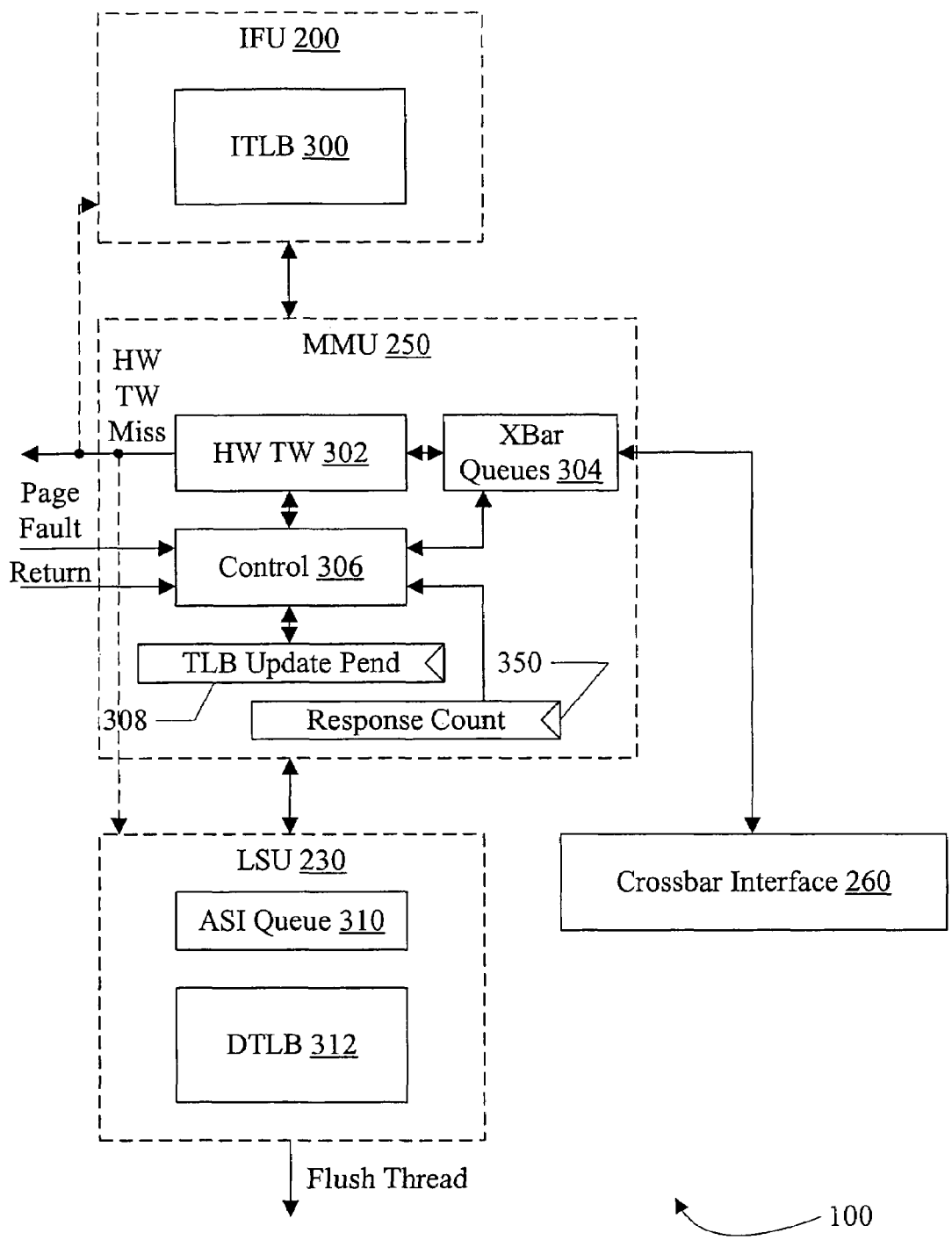
FIG. 7 is a block diagram of a portion of one embodiment of a core shown in greater detail.

Turning now to FIG. 7, a block diagram of one embodiment of a portion of the core 100 for implementing broadcast of demap commands between cores is shown. The embodiment of FIG. 7 may be similar to the embodiment of FIG. 4, and may include the ITLB 300 in the IFU 200 and the ASI queue 310 and the DTLB 312 in the LSU 230. Also similar to embodiment of FIG. 4, the embodiment of FIG. 7 may include the MMU 250 with the hardware table walk unit 302, crossbar queues 304, control unit 306, and TLB update pending register 308 coupled as shown in FIG. 4. Additionally, the control unit 306 is coupled to the crossbar queues 304 and there is a response count register 350 coupled to the control unit 306.

The internal processing of an executed demap operation may generally be similar to the discussion above with regard to FIGS. 4-6. However, in addition to delaying the demap operation if there is a pending TLB update, the control unit 306 may delay the demap operation to broadcast a corresponding demap command and await the responses from the receiving cores. That is, each demap operation may be delayed until the communication with other cores is completed. The control unit 306 is thus coupled to the crossbar queues 304 to transmit demap commands and to receive demap responses.

In one embodiment, the number of responses may be programmable in the response count register 350. For example, the response count register 350 may be an ASI register, model specific register, etc. In other embodiments, the response count may be fixed (e.g. at the number of cores integrated into the processor 10 on a single integrated circuit substrate) or may be provided in other fashions (e.g. pin strapping, fuses blown at manufacture, etc.).

Figure 8:
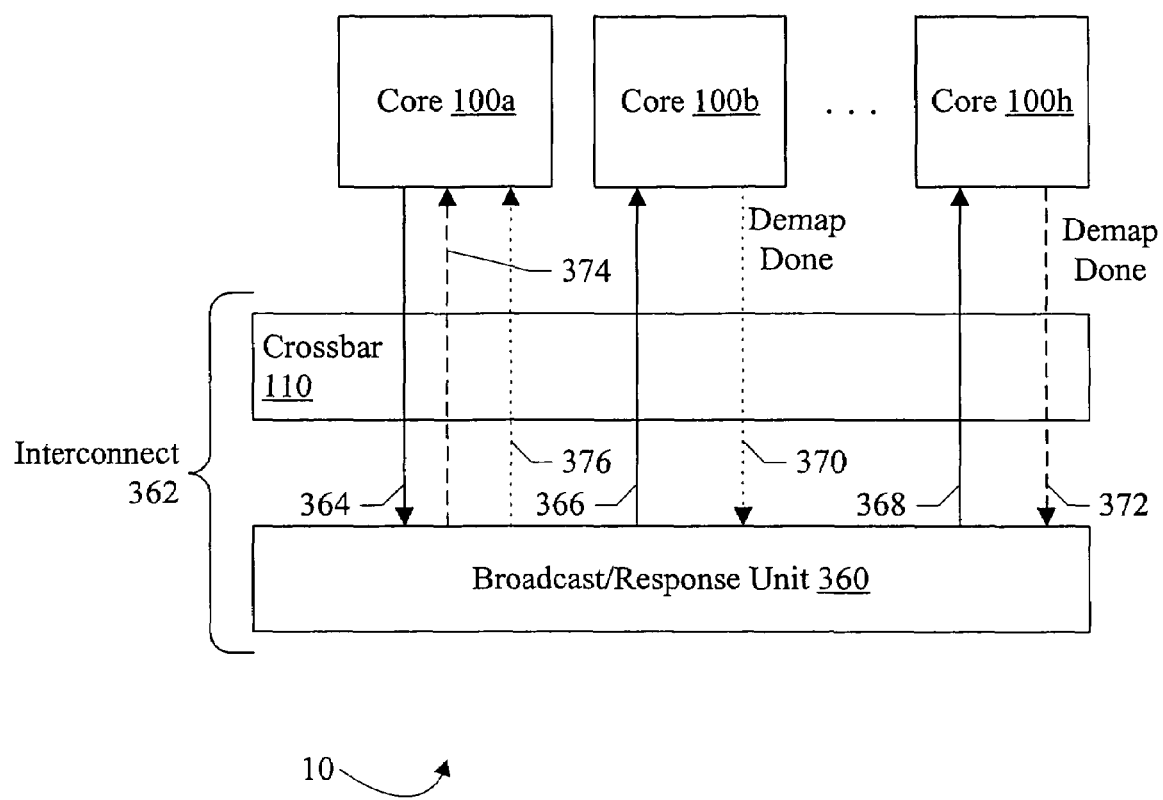
FIG. 8 is a block diagram of a portion of one embodiment of a processor illustrating one embodiment of broadcasting demap commands.

FIG. 8 is a block diagram of one embodiment of a portion of the processor 10. Illustrated in FIG. 8 are the cores 100a-100h and the crossbar 110. Additionally, a broadcast/response unit 360 is shown. The broadcast/response unit 360 is coupled to the crossbar 10. In the embodiment of FIG. 1, the cores 100a-100h are coupled on one side of the crossbar 110 and the memory system is on the other. Thus, in this embodiment, there is no direct communication between the cores 100a-100h. The broadcast/response unit 360 may receive the broadcast demap command from the source core and transmit it to the receiving cores. The broadcast/response unit 360 may also receive the responses ("demap done") in FIG. 8 from the receiving cores and transmit the response to the source core. In some embodiments, the broadcast/response unit 360 may be part of another unit (e.g. a non-cacheable unit that handles non-cacheable memory accesses).

For example, in FIG. 8, the core 100a transmits a demap command (solid arrow 364) on the crossbar 10. The broadcast/response unit 360 receives the demap command and transmits the demap command back across the crossbar 110 to the other cores (e.g. core 100b and 100h, solid arrows 366 and 368, respectively, in FIG. 8). The cores 100b and 100h transmit demap done responses on the crossbar 110 (dotted and dashed arrows 370 and 372, respectively). The broadcast/response unit 360 receives the demap done responses and transmits the responses to the core 100a (dotted and dashed arrows 374 and 376, respectively).

While the illustrated embodiment uses the crossbar 10 and the broadcast/response unit 360, in general any interconnect 362 may be used that permits a source core to broadcast a demap command to the receiving cores and that permits the receiving cores to return demap done responses to the source core. For example, a shared bus may be used; point to point links between cores, where cores relay commands from one core to another may be used; direct point to point links between each pair of cores may be used; etc.

Figure 9:
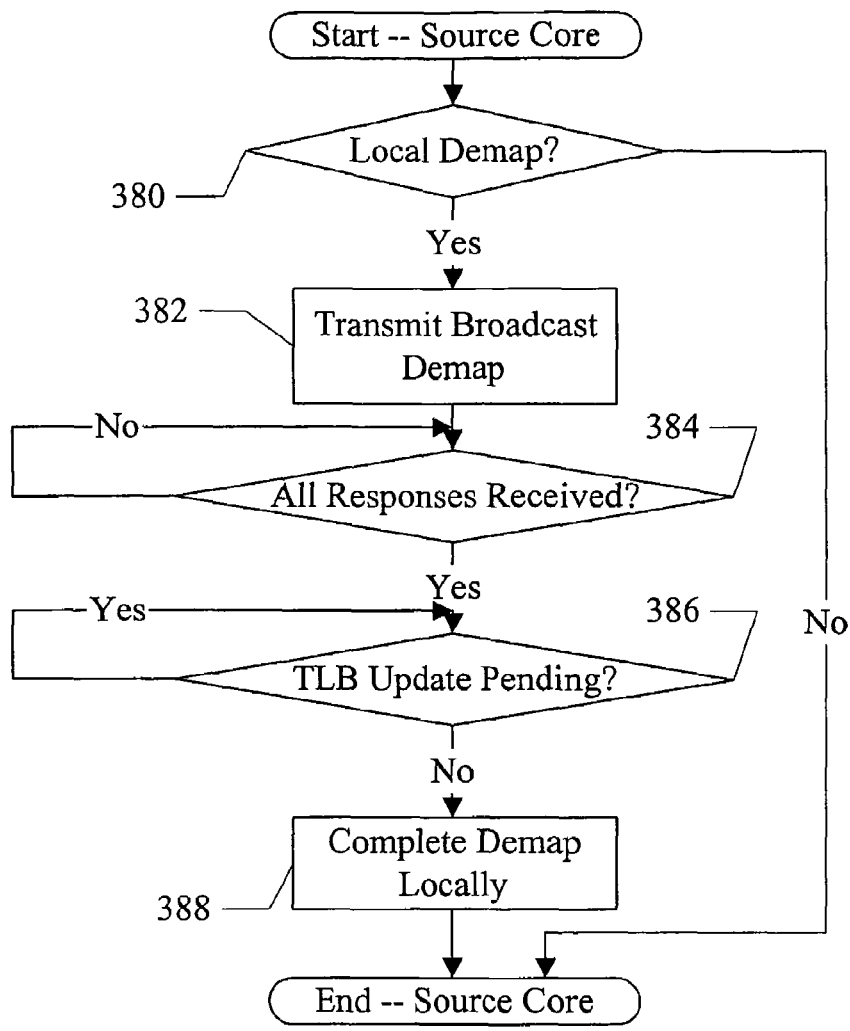
FIG. 9 is a flowchart illustrating operation of one embodiment of a source core that broadcasts a demap command.

Turning next to FIG. 9, a flowchart is shown illustrating operation of one embodiment of a source core. Any core 100a-100h may be a source core by executing a demap operation locally (that is, in its instruction pipeline). While the blocks are shown in a particular order in FIG. 9 for ease of understanding, blocks may be performed in parallel in combinatorial logic in the source core. Blocks, combinations of blocks, and/or the flowchart as a whole may be pipelined over multiple clock cycles.

The source core detects a local demap operation (decision block 380, "yes" leg). If there is no local demap operation, there is no source core operation. The source core transmits the broadcast demap command (block 382). Particularly, the control unit 306 may generate the broadcast demap command and queue it in the crossbar queues 304, and the crossbar interface 260 may read the demap command from the crossbar queues 304 and transmit the demap command on the crossbar 110. The source core waits for the demap done responses to be received from each receiving core (decision block 384). As mentioned previously, in one embodiment, the number of responses to expect may be programmed into the response count register 350. Once the response has been received from each receiving core, the source core may process the local demap operation (e.g. waiting for no TLB updates to be pending, decision block 386, and completing the demap operation by invalidating the identified translations in the TLBs, block 388). In other embodiments, the invalidation of the local TLBs may take place when no updates are pending, independent of whether or not all of the responses have been received from the receiving nodes. In such an embodiment, the control unit 306 may signal the LSU 230 that the demap operation is complete after the responses have been received and the local TLB invalidations have occurred. Thus, in general, the processor core 100 may delay continued processing subsequent to the demap operation on the strand that executed the demap operation until all the responses are received.

Figure 10:
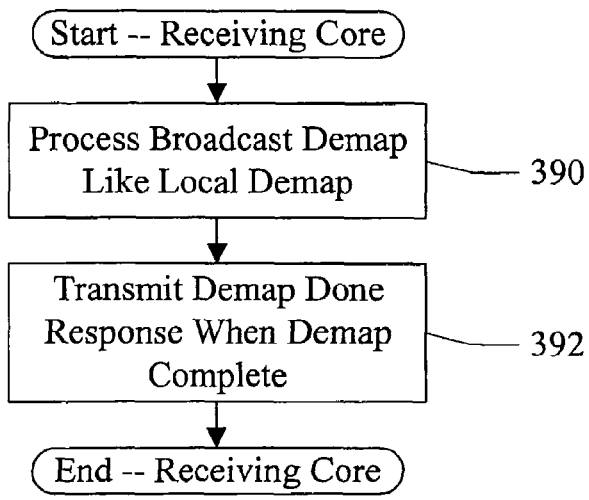
FIG. 10 is a flowchart illustration operation of one embodiment of a receiving core that receives a broadcast demap command.

FIG. 10 is a flowchart illustrating operation of one embodiment of a receiving core. Any core 100a-100h may be a receiving core by receiving a broadcast demap command. While the blocks are shown in a particular order in FIG. 10 for ease of understanding, blocks may be performed in parallel in combinatorial logic in the source core. Blocks, combinations of blocks, and/or the flowchart as a whole may be pipelined over multiple clock cycles.

The receiving core may process the broadcast demap command in a similar fashion to the local demap operation (block 390). That is, the control unit 306 may delay the demap until there are no pending TLB updates, and may perform the invalidations in the TLBs. The receiving core may then transmit a demap done response (block 392). For example, the control unit 306 may generate the demap done response and enqueue it in the crossbar queues 304, and the crossbar interface 260 may transmit the demap done response on the crossbar 110.

Exemplary System Embodiment

Figure 11:
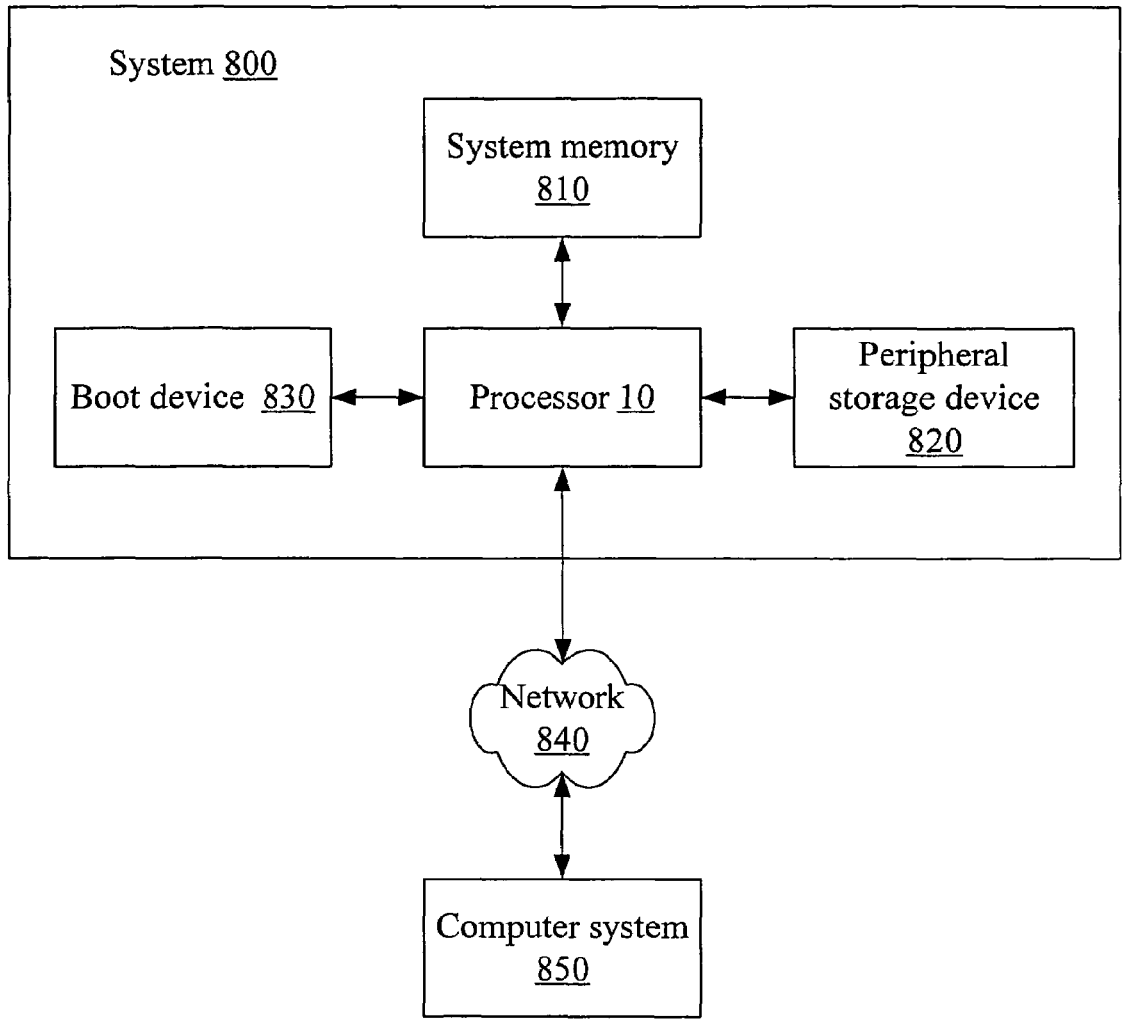
FIG. 11 is a block diagram of one embodiment of a computer system including the processor shown in FIG. 1.

As described above, in some embodiments processor 10 of FIG. 1 may be configured to interface with a number of external devices. One embodiment of a system including processor 10 is illustrated in FIG. 11. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Numerous variations and modifications will become apparent to those skilled in the art once the above disclosure is fully appreciated. It is intended that the following claims be interpreted to embrace all such variations and modifications.

What is claimed is:

1. A processor comprising:
a plurality of processor cores, wherein each of the plurality of processor cores comprises at least one translation lookaside buffer (TLB); and
an interconnect to which the plurality of processor cores are coupled;
wherein a first processor core of the plurality of processor cores is configured to broadcast a demap command on the interconnect responsive to executing a demap operation in the first processor core, and wherein the demap command identifies one or more translations to be invalidated in each TLB in each of the plurality of processor cores, and wherein remaining processor cores of the plurality of processor cores are configured to invalidate the one or more translations in the respective TLBs and to transmit a response to the first processor core, and wherein the first processor core is configured to delay continued processing of the demap operation, including delaying invalidation of the one or more translations in the TLB in the first processor core, until the responses are received from each of the remaining processor cores.

2. The processor as recited in claim 1 wherein each of the plurality of processor cores is multithreaded.

3. The processor as recited in claim 2 wherein at least some strands in a given processor core share the TLB in that processor core, and wherein the demap operation is issued on only one of the sharing strands.

4. The processor as recited in claim 1 wherein the at least one TLB in each processor core comprises an instruction TLB and a data TLB in each processor core, and wherein invalidating the one or more translations comprises invalidating the one or more translations in one or both of the instruction TLB and the data TLB.

5. The processor as recited in claim 1 wherein each of the plurality of processor cores is programmable with a number of expected responses, and wherein the first processor core is configured to use the number of expected responses and a count of received responses to determine that all of the responses have been received from the remaining processor cores.

6. The processor as recited in claim 1 wherein the remaining processor cores are configured to process the demap command as if a locally executed demap operation occurred.

7. A processor comprising:
a plurality of processor cores, wherein each processor core of the plurality of processor cores comprises a plurality of strands, wherein each strand comprises hardware to support a different thread of a plurality of concurrently activateable threads in the processor core, and wherein each processor core further comprises at least one translation lookaside buffer (TLB); and
an interconnect to which the plurality of processor cores are coupled;
wherein a first processor core of the plurality of processor cores is configured to broadcast a demap command on the interconnect responsive to executing a demap operation in the first processor core, and wherein the demap command identifies one or more translations to be invalidated in each TLB in each of the plurality of processor cores, and wherein remaining processor cores of the plurality of processor cores are configured to invalidate the one or more translations in the respective TLBs and to transmit a response to the first processor core, and wherein the first processor core is configured to delay continued processing of the demap operation, including delaying invalidation of the one or more translations in the TLB in the first processor core, until the responses are received from each of the remaining processor cores.

8. The processor as recited in claim 7 wherein each of the plurality of processor cores is programmable with a number of expected responses, and wherein the first processor core is configured to use the number of expected responses and a count of received responses to determine that all of the responses have been received from the remaining processor cores.

9. The processor as recited in claim 7 wherein at least two strands in the first processor core share the TLB in the first processor core, and wherein the demap operation is issued on only one of the sharing strands.

10. The processor as recited in claim 7 wherein the at least one TLB in each processor core comprises an instruction TLB and a data TLB in each processor core, and wherein invalidating the one or more translations comprises invalidating the one or more translations in one or both of the instruction TLB and the data TLB.

11. The processor as recited in claim 7 wherein the remaining processor cores are configured to process the demap command as if a locally executed demap operation occurred.

12. A method for a system that includes a plurality of processor cores, wherein each of the plurality of processor cores comprises at least one translation lookaside buffer (TLB), and an interconnect to which the plurality of processor cores are coupled, the method comprising:
- a first processor core of the plurality of processor cores executing a demap operation;
- responsive to executing the demap operation, the first processor core of the plurality of processor cores broadcasting a demap command on the interconnect, wherein the demap command identifies one or more translations to be invalidated in each TLB in each of the plurality of processor cores;
- remaining processor cores of the plurality of processor cores invalidating the one or more translations in the respective TLBs;
- each remaining processor core transmitting a response to the first processor core; and
- the first processor core delaying continued processing of the demap operation, including delaying invalidation of the one or more translations in the TLB in the first processor core, until the responses are received from each of the remaining processor cores.

13. The method as recited in claim 12 wherein each of the plurality of processor cores is multithreaded.

14. The method as recited in claim 13 wherein at least some strands in a given processor core share the TLB in that processor core, the method further comprising the demap operation issuing on only one of the sharing strands.

15. The method as recited in claim 12 wherein the at least one TLB in each processor core comprises an instruction TLB and a data TLB in each processor core, and wherein invalidating the one or more translations comprises invalidating the one or more translations in one or both of the instruction TLB and the data TLB.

16. The method as recited in claim 12 further comprising:
- programming each of the plurality of processor cores with a number of expected responses; and
- the first processor core using the number of expected responses and a count of received responses to determine that all of the responses have been received from the remaining processor cores.

17. The method as recited in claim 12 further comprising the remaining processor cores processing the demap command as if a locally executed demap operation occurred.

* * * * *